United States Patent [19]

Diedrich et al.

[11] Patent Number: 5,787,450
[45] Date of Patent: Jul. 28, 1998

[54] APPARATUS AND METHOD FOR CONSTRUCTING A NON-LINEAR DATA OBJECT FROM A COMMON GATEWAY INTERFACE

[75] Inventors: Richard Alan Diedrich, Rochester, Minn.; Scott Thomas Evans, Newark Valley; James Kevan Finkenaur, New Paltz, both of N.Y.

[73] Assignee: International Business Machines Corporation, Armonk, N.Y.

[21] Appl. No.: 654,989

[22] Filed: May 29, 1996

[51] Int. Cl.⁶ .................................................. G06F 17/00
[52] U.S. Cl. ................... 707/513; 707/101; 707/6; 707/516; 707/512
[58] Field of Search ................... 707/1–10, 501–531, 707/100–104

[56] References Cited

U.S. PATENT DOCUMENTS

| | | | |
|---|---|---|---|
| 4,787,035 | 11/1988 | Bourne | 364/300 |
| 4,839,853 | 6/1989 | Deerwester et al. | 364/900 |
| 4,905,138 | 2/1990 | Bourne | 364/200 |
| 5,297,249 | 3/1994 | Bernstein et al. | 395/156 |
| 5,337,233 | 8/1994 | Hofert et al. | 364/419.14 |
| 5,365,433 | 11/1994 | Steinberg et al. | 364/419.08 |
| 5,369,577 | 11/1994 | Kadashevich et al. | 364/419.13 |
| 5,414,841 | 5/1995 | Bingham et al. | 395/600 |
| 5,475,588 | 12/1995 | Schabes et al. | 364/419.08 |
| 5,530,852 | 6/1996 | Meske et al. | 395/600 |
| 5,548,699 | 8/1996 | Ishida et al. | 395/140 |
| 5,623,679 | 4/1997 | Rivette et al. | 395/773 |
| 5,649,218 | 7/1997 | Saito | 395/774 |

OTHER PUBLICATIONS

IBM Technical Disclosure Bulletin, vol. 37, No. 12, Dec. 1994, "Providing Hypertext Links to Code", J. A. Kelly.

IBM Technical Disclosure Bulletin, vol. 38, No. 12, Dec. 1995, "Sequence Reception Method for a Fibre Channel Protocol Chip", G. M. Nordstrom.

IBM Technical Disclosure Bulletin, vol. 27, No.7A, Dec. 1984, Instruction for Text Manipulation (Find Long), J. T. Brady.

*Primary Examiner*—Thomas G. Black
*Assistant Examiner*—David Jung
*Attorney, Agent, or Firm*—Shelley M. Beckstrand

[57] ABSTRACT

A computer implemented method and apparatus for creating a data structure comprising a non-linear data object with typed data fields and field names from a common gateway interface type input string.

6 Claims, 2 Drawing Sheets

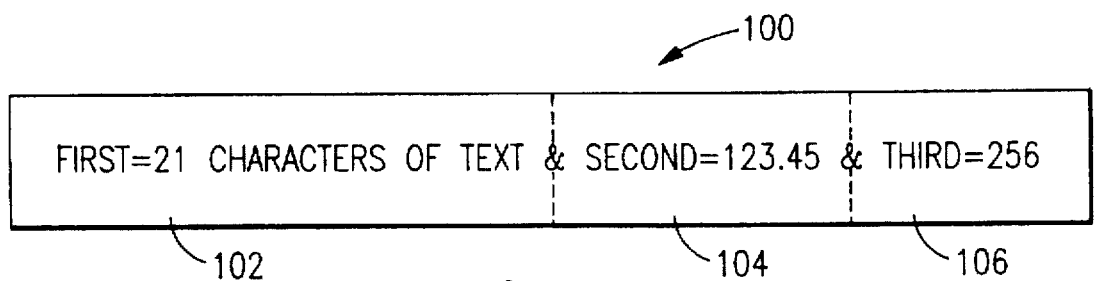
FIG. 1
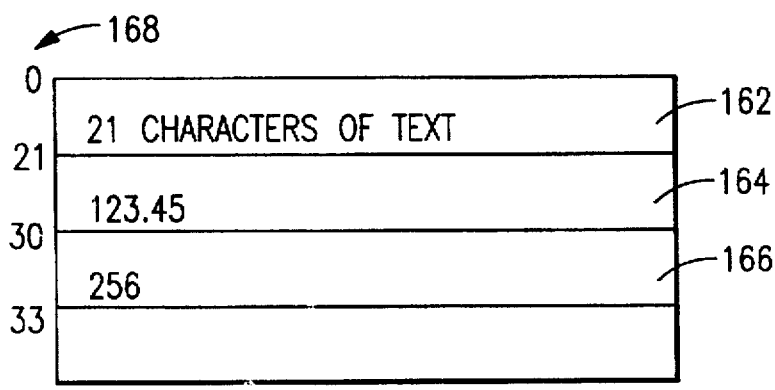
FIG. 2
FIG. 3

APPARATUS AND METHOD FOR CONSTRUCTING A NON-LINEAR DATA OBJECT FROM A COMMON GATEWAY INTERFACE

BACKGROUND OF THE INVENTION

1. Technical Field of the Invention

This invention relates to a computer implemented method and apparatus for creating a data structure. More specifically, to a method and apparatus for creating a data structure comprising a non-linear data object with typed data fields and field names from a common gateway interface type input string.

2. Background Art

When writing a common gateway interface (CGI) program to run under a hypertext markup language (HTML) document server, input data to the CGI program comes in one long text string in the format:

"KeyWordName1=value1&KeyWordName2=value2& ..

KeyWordNameN=valueN".

This data can be cumbersome to parse into individual values. It is much preferred, for ease of use for many users of computing systems, to present data organized into useful records and fields.

For example, users of IBM AS/400 series machines tend to be most familiar using and viewing data as records and fields in a database. Also, such users are typically familiar with the use of data description specification (DDS) files to organize data into useful records and fields.

It is, therefore, an object of the invention to provide a method for organizing CGI input data, using a DDS file description as the template, into useful records and fields; that is, a data structure comprising a non-linear data object with typed data fields and field names derived from a common gateway interface type input string.

It is a further object of the invention to provide in that non-linear data object data which is converted to the proper data type for each field, such as alphanumeric, integer, or decimal.

SUMMARY OF THE INVENTION

This invention provides an apparatus and method for operating a digital computer to receive an input string including a plurality of text keyword/value pairs; to build from the keyword/value pairs a data structure of converted values without keywords.

In accordance with a further aspect of the invention, a template file listing is provided including for each keyword, the data type and size for the corresponding value; and the data structure is organized to place a converted value within said data structure at an offset determined with reference to the size associated with the keywords in the template file.

In accordance with a further aspect of the invention, a memory element (such as a computer disk or tape, or other non-volatile memory device), or a transmission medium (such as wire or air) or a volatile memory device (such as main memory) is provided to store or transmit signals which are adaptable to operate a computer in accordance with the processes set forth in the previous paragraphs.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 illustrates the format of a typical input string to a common gateway interface (CGI) program.

FIG. 2 illustrates a data description specification (DDS) file specification, or template file.

FIG. 3 illustrates the contents of the output buffer resulting from executing the method of the invention on the input string of FIG. 1.

BEST MODE FOR CARRYING OUT THE INVENTION

Figure 4:
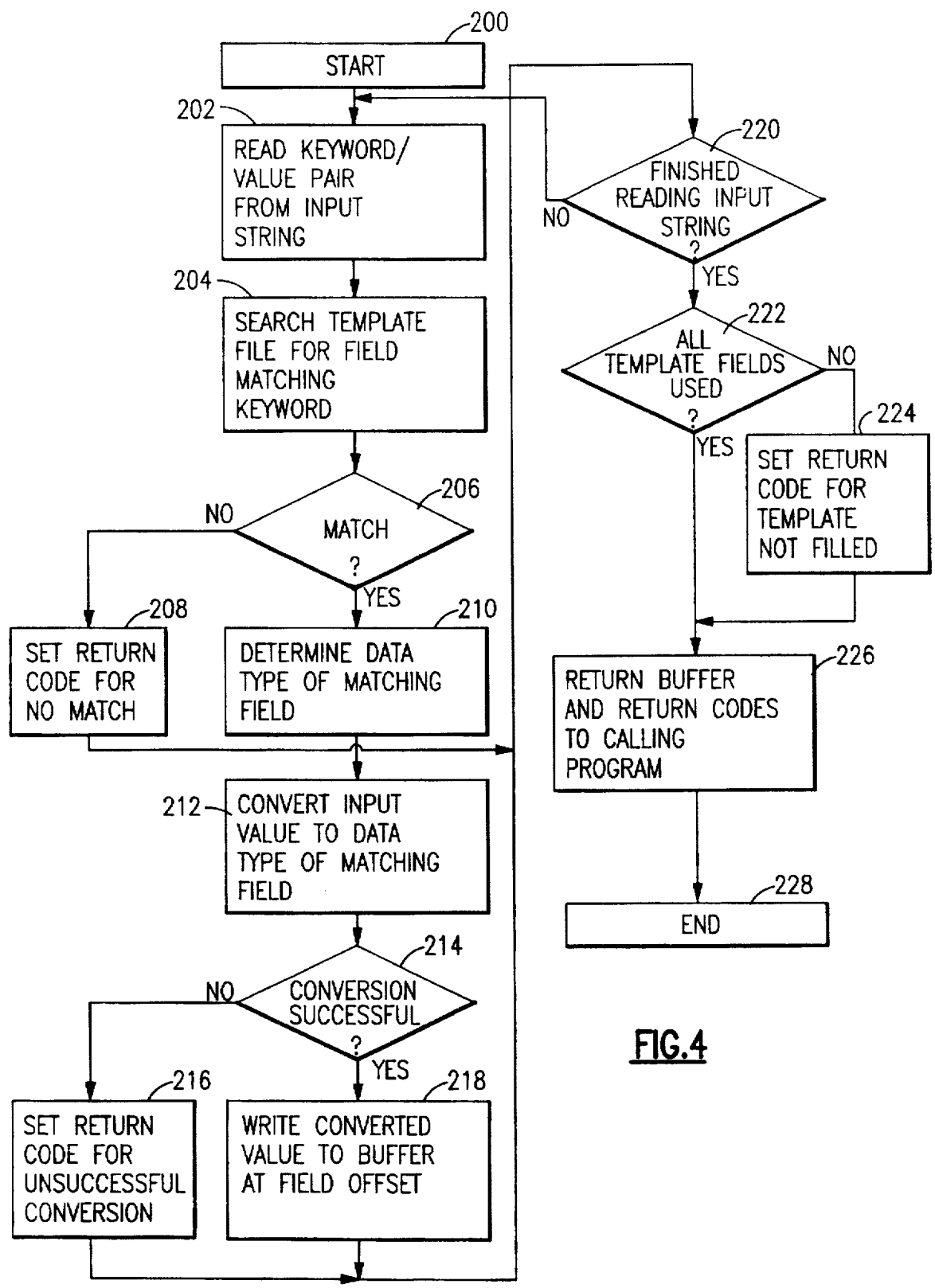
FIG. 4 is a flow diagram of the method of the invention.

Referring to FIGS. 1–3, the application program interface (API) of a preferred embodiment of this invention provides an interface for common gateway interface (CGI) programs to parse CGI input 100, defined as a series of keywords and their values, each keyword/value pair 102, 104, 106 being all text data separated by a delimiter character, in this embodiment "&", into a buffer 160 which is formatted according to a data definition specification (DDS) file specification or template 140.

Table 1 sets forth the API specification QtmhCvtDB, illustrating a preferred embodiment of the invention.

TABLE 1

```
QTMH_EXTERN void QtmhCvtDb
       (void *, /* qualified DDS file name   */
        char *, /* buffer containing the string of
                   CGI keyword parameters to be
                   parsed.                    */
        int  *, /* length of the string of CGI
                   keyword parameters to be
                   parsed.                    */
        void *, /* output buffer into which the
                   parsed parameter values will be
                   stored.                    */
        int  *, /* length of buffer provided for
                   parsed paramter values.    */
        int  *, /* response length.           */
        int  *, /* response code.             */
        void *, /* error code.                */
```

Referring to FIG. 2, DDS file specification includes, in this example, record name field 142 and a series of field pairs 144, 146 setting forth a template of field names 144 (in this example, field names FIRST, SECOND and THIRD), and corresponding data type and field size definitions 146 (in this example, 21 characters of alphanumeric, 9.3 poision floating point, and 3 position binary or integer, respectively.)

Referring to FIG. 3, the contents of output buffer 160 resulting from execution of the method of the invention shows a plurality of variable length records 162, 164, 166 located at offsets 168 of 1, 21 and 30, respectively, each record containing values converted to proper type from the corresponding text name/value pairs 102, 104, and 106 of the CGI input string.

The advantage to the user, or CGI programmer, is that returned data can be referenced by structure member name, and the data is returned in useable types. Thus, the CGI programmer enters:

CGI_INPUT_STRUCT.FIRST and the returned data is useable, such that 10% of the third parameter is

CGI_INPUT_STRUCT.THIRD * 0.1

Referring to FIG. 4, a flow chart of the method of the invention for constructing a typed data structure from a text input string is set forth. In step 200, initialization routines are executed which set up variables, establish working space in memory, read in the DDS template file 140, and receive the passed parameters, including:

| | |
|---|---|
| PtrDbFileName | name of DB template file 140 |
| PtrParseString | the input string |
| StringLength | length of the input string |
| PtrRecBuffer | variable to hold response |
| BufferLength | length of buffer |
| PtrRespLength | length of response |
| PtrRespcode | response code |
| PtrEcStruc | error code structure |

Various local variables are established, the passed pointers and variables are checked for validity, a signal handler is turned on to catch exceptions, null and zero fields are checked, user space to contain the output from the list APIs is created, and a previously created definition of fields from the db__list[ ] array is found or a definition of fields is created using the appropriate APIs.

In step 202, a keyword/value pair 102 is read from input string 100. In step 204, template 140 is searched for a match of the keyword word from pair 102 with a keyword 144. If, in step 206, a match is not found in step 208, a bit or field is set in the return codes indicating such, and processing passes to block 220. Otherwise, upon a successful match in block 206, the data type and size for the value in keyword/value pair 102 is determined from entry 146 in template file 140 corresponding to the keyword 144. In step 212, the value in keyword/value pair 102 is converted to the correct data type and size determined in step 210. If the conversion is not successful, such as would be the case if the input value 102 is floating point and the correct data type is day-of-week, for example, then in step 216 a bit or field in the return code is set for unsuccessful conversion, and processing passes to step 220. Otherwise, if conversion is successful, in step 218 the converted value is placed in output buffer 168 at the appropriate offset (in this case, as the first keyword, from pair 102, is also the first keyword in template file 140, then the offset is zero. In this specific embodiment, for subsequent fields 164 and 166, the offset will be related to the sum of field sizes for previous entries in template 140.)

In step 220 it is determined if all keyword/value pairs have been read from input string 100 and, if not, processing passes to step 202 where the next keyword/value pair 104, for example, is read and processed through steps 218. When all keyword/value pairs have been read from input string 100, template 140 is examined to see if all template fields 144 have been used, and if not, in step 224 a bit or field is set in the return code indicating such. Processing then, in either case, passes to step 226 where buffer 168 and the return codes are returned to the calling program, and processing ends.

Table 2 sets forth a source code listing of the main routine implementing the process illustrated in FIG. 2. As will be apparent to those skilled in the art, and therefore not set forth in the source code listing of Table 2, initial routines are provided for declaring and initializing local variables; turning on a SignalHandler to catch exceptions; checking all passed pointers for validity, and that they are not null or zero; handling errors and raising exceptions; assuring that error code structures are valid. Table 2 includes a description, in lines 1825 through 1847, of the process for finding or creating user space to contain output from the list APIs QUSLFLD and QUSLRCD.

TABLE 2

MAIN ROUTINE

| | |
|---|---|
| 1825 | if (list__header == NULL) |
| 1826 | create__list__space(); |
| 1833 | db__cvt = find__db__cvt((char*)PtrDbFileName); |
| 1835 | reset__fields(db__cvt); |
| 1836 | memcpy(parm__data, PtrParseString, StringLength); |
| 1837 | parm__data[*PtrStringLength] = '\0' |
| 1838 | PtrTempReceiver = (char*)malloc(RequiredBuffersize); |
| 1839 | RequestMethod = getenv("REQUEST__METHOD"); |
| 1842 | if (strcmp(requestMethod, "GET") !=0 |
| 1843 | { |
| 1844 | ptr__char = strcat("first?", parm__data); |
| 1845 | strcpy(parm__data, ptr__char); |
| 1846 | } |
| 1847 | strtok(parm__data, "?"); |
| 1848 | while ((field__name=strtok(NULL,"=")) !=NULL |
| 1849 | { |
| 1850 | if ((data = strtok(NULL,",&")) !=NULL |
| 1851 | { |
| 1852 | fill__field(db__cvt, (char*)PtrTempReceiver, cvt__data(field__name) ,cvt__data(data), &error__flag); |
| 1854 | } |
| 1855 | } |
| 1856 | fill__unused__fields(db__cvt,(char*) PtrTempReceiver,&error__flag); |
| 1858 | if (BufferLength >= RequiredBuffersize) memcpy(PtrRecBuffer, PtrTempReceiver, RequiredBufferSize); |
| 1861 | *PtrRespLength = RequiredBufferSize; |
| 1862 | if (error__flag > 4) error__flag &= 3; |
| 1864 | *PtrRespCode = -(error__flag); |
| 1865 | signal (SIGALL, original__handler); |
| 1866 | return; |
| 1867 | } |

Several functions are called in the course of processing the main routine and related routines, among them the following: (1) cvt__to__alpha copies data from source to result and pads with blanks; (2) cvt__to__pd converts data to packed decimal; and (3) cvt__to__f converts data to floating point notation; (4) cvt__to__i converts data to integer. C-code routines for several other functions and structures helpful to an understanding of a preferred embodiment of the invention are set forth in the following tables.

Table 3 describes the create__list__space function, which creates the space to be used by the list APIs QUSLFLD and QUSLRCD.

TABLE 3

CREATE LIST SPACE

```
void create__list__space(void)
{
char attrb[10];
char desc[50],
void *space__ptr;
int error__code = 0;
sprintf(list__space__name, "%-10s%", LIST__SPACE,
    LIST__SPACE__LIB);
memset(attrb, ' ', 10);
memset(desc, ' ', 50);
sprintf(attrb, "%- 10s", LIST__SPACE__ATTR);
sprintf(desc, "%-50s", LIST__SPACE__DESC);
QUSCRTUS(list__space__name, attrb, LIST__SPACE__SIZE,
    "\0", "*LIBCRTAUT", desc, "*YES         ",
    &error__code);
QUSPTRUS(list__space__name, &space__ptr);
```

TABLE 3-continued

CREATE LIST SPACE

```
    list_header = (header_struct*)space_ptr;
}
```

Table 4 describes the create_db_cvt function, which reads in the DDS template file and creates the db_cvt_t structure; list_header contains the address of user space. A call to the List Record Formats API generates a list of record formats available for the file named in the calling parameter list (db_name). This code assumes there will only be one record format returned (it only looks at the first record format name returned.) The List Fields API is called to generate a list of field names and descriptions from the record format name returned by the QUSLRCD() API.

TABLE 4

CREATE DB CONVERT STRUCTURE

```
DB_CVT_t *create_db_cvt(char *db_name)
{
    Qdb_Lrcd_RCDL0100_t *record_list;
    Qdb_Lfld_FLDL0100_t *field_list;
    DB_CVT_t *db_cvt;
    FIELD_CVT_t *field_cvt;
    int field;
    QUSLRCD(list_space_name, "RCDL0100", db_name,
            "0") ;
    record_list = (Qdb_Lrcd_RCDL0100 *) ((char*)
                    list_header + list_header->
                    list_section_offset);
    QUSLFLD(list_space_name, "FLDL0100", db_name,
            record_list->Format_Name, "0");
    field_list = (Qdb_Lfld_FLDL0100 *)
                    ((char*)list_header +
                    list_header->list_section_offset);
    db_cvt = (DB_CVT_t*)malloc(size of(DB_CVT_t) +
                    (list_header->number_of_entries - 1) *
                    sizeof(FIELD_CVT_t));
    db_cvt->field_count = list_header->
                    number_of_entries;
    memcpy(db_list[db_count].db_name,
            db_name, 20);
    db_list[db_count].db_cvt = db_cvt;
    db_count++;
    field_cvt = db_cvt->field_cvt;
    for (field = 0; field < db_cvt->field_count;
                    field++, field_cvt++)
    {
     memcpy(field_cvt->field_name, field_list->
            Field_Name, 10);
        field_cvt->field_offset = field_list->
            Input_Buffer_Position - 1;
        field_cvt->field_type = field list->Data_Type;
        RequiredBufferSize = field_list->
            Input_Buffer_Position - 1 + field list->
            Field_Length_Bytes;
        switch (field_cvt->field_type)
        {
            case 'A':
            case 'S':
            case 'T':
            case 'L':
            case 'Z': field_cvt->field_length =
                    field_list->Field Length_Bytes;
                field_cvt->field_dec_pos = 0;
                field_cvt->convert_function =
                    cvt_to_alpha;
                break;
            case 'P': field_cvt->field_length =
                    field_list->Digits;
                field_cvt->field_dec_pos =
                    field_list->Decimal Positions;
                field_cvt->convert_function =
```

TABLE 4-continued

CREATE DB CONVERT STRUCTURE

```
                    cvt_to_pd;
                break;
            case "F": field_cvt->field_length =
                    field_list->Field_Length_Bytes;
                field_cvt->field_dec_pos =
                    field_list->Decimal_Positions;
                field_cvt->convert_function =
                    cvt_to_f;
                break;
            case "B": field_cvt->field_length =
                    field_list->Field_Length_Bytes;
                field_cvt->field_dec_pos = 0;
                field_cvt->convert_function =
                    cvt_to_i;
                break;
        }
        field list = (Qdb_Lfld_FLDL0100 *)((char *)
                    field_list + list_header ->
                    size_of_entry);
    }
    return db_cvt;
}
```

Table 5 describes the find_db_cvt function, which finds an existing db_cvt_t structure, if it exists, containing field definitions that have already been created.

TABLE 5

FIND DB CONVERT

```
DB_CVT_t *find_db_cvt(char *db_name)
{
    int i;
    for (i = 0; i < db_count; i++)
        if (memcmp(db_list[i].db_name,
                db_name, 20) == 0)
            return db_list[i].db_cvt;
    return create_db_cvt(db_name);
}
```

Table 6 describes the reset_fields function.

TABLE 6

RESET FIELDS

```
void reset_fields(DB_CVT_t *db_cvt)
{
    int i;
    FIELD_CVT_t *field_cvt;
    field_cvt = db_cvt->field_cvt;
    for (i = 0; i < db_cvt->field_count; i++,
            field_cvt++) field_cvt->field_used = 0
}
```

Table 7 describes the fill_unused_fields function, which fills all the unused fields with appropriate filler.

TABLE 7

FILL UNUSED FIELDS

```
void fill_unused_fields(DB_CVT_t *db_cvt, char
        *buffer, int *error_field)
{
    int i;
    FIELD_CVT_t *field_cvt;
    int error;
    field_cvt = db_cvt->field_cvt;
    for (i = 0; i < db_cvt->field_count;
```

TABLE 7-continued

FILL UNUSED FIELDS

```
        i++, field_cvt++)
    if (field_cvt->field_used == 0)
    {
        *error_field = *error_field | 1;
        switch (field_cvt->field_type)
        {
            case 'A':
            case 'S':
            case 'T':
            case 'L':
            case 'Z':
                field_cvt->convert_function(buffer +
                    field_cvt->field_offset, " "
                    field_cvt->field_length, 0, &error);
                break;
            case 'B':
            case 'P':
            case 'F':
                field_cvt->convert_function(buffer +
                    field_cvt->field_offset, "0",
                    field_cvt->field_length,
                    field_cvt->field_dec_pos, &error);
                break;
        }
    }
}
```

Table 8 describes the cvt_data function, which converts the data passed to upper case, converts plus signs to blanks, and converts escape sequences (identified by % sign) to a single character.

TABLE 8

CONVERT DATA

```
char *cvt_data(char *s)
{
    char *c;
    c = s;
    while ((c = strchr(c, '+')) != NULL)
        *c++ = ' ';
    c = s;
    while ((c = strchr(c, '%')) != NULL)
    {
        *(c + 1) = toupper(*(c + 1));
        *(c + 2) = toupper(*(c + 2));
        cvtch(c + 1, 2);
        strcpy(c + 1, c + 3);
        c++;
    }
    return s;
}
```

Table 9 describes the fill_field function, which fills in the buffer with the information for this field and creates padded names.

TABLE 9

FILL FIELD

```
void fill_field(DB_CVT_t *db_cvt, char *buffer, char
    *field_name, char *data, int *error_field)
{
    FIELD_CVT_t *field_cvt;
    char padded_name[11];
    int error;
    int i = strlen(field_name);
    char *c = padded_name;
    sprintf(padded_name, "%-10s", field_name);
    while (i--)
```

TABLE 9-continued

FILL FIELD

```
    {
        *c = toupper(*c);
        c++;
    }
    field_cvt = db_cvt->field_cvt;
    for (i = 0; i < db_cvt->field_count; i++,
        field_cvt++)
    {
        if (memcmp(padded_name, field_cvt->field_name,
            10) == 0)
        {
            switch (field_cvt->field_type)
            {
                case 'A':
                case 'B':
                case 'S':
                case 'T':
                case 'L':
                case 'Z':
                case 'P':
                case 'F': field_cvt->
                    convert_function(buffer +
                        field_cvt->field_offset,
                        data, field_cvt->field_length,
                        field_cvt->field_dec_pos,
                        &error);
                    field_cvt->field_used = 1;
                    if (error != 0)
                        *error_field = *error_field |
                            4;
                    return;
            }
        }
        else if (i == (db_cvt->field_count -1))
            *error_field = *error_field | 2;
    }
}
```

Advantages over the Prior Art

This invention provides a method and programming structure for creating a data structure comprising a non-linear data object with typed data fields and field names from a common gateway interface type input string.

Alternative Embodiments

It will be appreciated that, although specific embodiments of the invention have been described herein for purposes of illustration, various modifications may be made without departing from the spirit and scope of the invention. For example, the digital signals required to operate the computer to perform the method of the invention may be stored in or transmitted through a storage or transmission medium.

Accordingly, the scope of protection of this invention is limited only by the following claims and their equivalents.

We claim:

1. A method for constructing a data structure including data defined data types from a text input string including a plurality of pairs of keywords and corresponding values, comprising the steps of:

generating in a template file an ordered list of fields defining for each keyword a data type and size;

receiving from a calling program said input string;

reading a pair from said input string;

searching said template file for a field name matching the keyword in the pair;

determining from the template file the data type for the matching field name;

converting said value from text to the data type of said matching field;

writing the converted value to an output buffer at a location in said data structure corresponding to said matching field; and repeating said reading, searching, determining, converting, and writing steps for each pair in said input string.

2. The method of claim 1, comprising the further steps of:

during said reading, searching, determining, converting, and writing steps, keeping track of unused template fields within said template, and of pairs not having a matching field within said template;

generating a response code indicating whether or not all fields in said template were filled, whether all input data was used, and whether all data was successfully converted; and returning said output buffer and said response code to the calling program.

3. A method for constructing a data structure including data of data description specification (DDS) defined data types from a common gateway interface (CGI) input string, comprising the steps of:

generating a template file of DDS definitions;

receiving from a calling program a CGI input string including alpha-numeric data arranged in a plurality of pairs of text keywords and corresponding text values;

reading a pair from said input string;

searching a template file of DDS definitions for a field matching said text keyword;

determining from the matching DDS definition the data type of the matching text value;

converting said value from text to the data type of said matching field;

writing the converted value to an output buffer at a location in said data structure corresponding to said matching field; and repeating said reading, searching, determining, converting, and writing steps for each pair.

4. The method of claim 3, comprising the further steps of:

during said reading, searching, determining converting, and writing steps, keeping track of unused template fields within said template, and of pairs not having a matching field within said template;

generating a response code indicating whether or not all fields in said template were filled, whether all input data was used, and whether all data was successfully converted; and returning said output buffer and said response code to the calling program.

5. A memory device for storing control signals operable to cause a digital computer to construct a data structure including data defined data types from a text input string including a plurality of pairs of text keywords and text values, said control signals including signals for operating said computer to:

provide in a template file an ordered list of fields defining for each keyword a data type and size;

receive from a calling program said text input string;

read a pair from said input string;

search said template file for a field name matching the keyword in the pair;

determine from the template file the data type for the matching field name;

convert said value from text to the data type of said matching field;

write the converted value to an output buffer at a location in said data structure corresponding to said matching field; and repeat read, search, determine, convert, and write steps for each pair in said input string.

6. A signal transmission medium for transmitting control signals operable to cause a digital computer to construct a data structure including data defined data types from a text input string including a plurality of keyword/value pairs, said control signals including signals for operating said computer to:

provide in a template file an ordered list of fields defining for each keyword a data type and size;

receive from a calling program said text input string;

read a pair from said input string;

search said template file for a field name matching the keyword in the pair;

determine from the template file the data type for the matching field name;

convert said value from text to the data type of said matching field;

write the converted value to an output buffer at a location in said data structure corresponding to said matching field; and repeat read, search, determine, convert, and write steps for each pair in said input string.

* * * * *